Jan. 24, 1961 C. G. DE HAVEN ET AL 2,968,833
METHOD AND APPARATUS FOR PRILLING AMMONIUM NITRATE
Filed May 17, 1957 4 Sheets-Sheet 1

INVENTORS
C.G. DeHAVEN
R.O. WELTY
BY
Hudson & Young
ATTORNEYS

Jan. 24, 1961    C. G. DE HAVEN ET AL    2,968,833
METHOD AND APPARATUS FOR PRILLING AMMONIUM NITRATE
Filed May 17, 1957    4 Sheets-Sheet 2

INVENTORS
C. G. DeHAVEN
R. O. WELTY
BY
Hudson & Young
ATTORNEYS

INVENTORS
C.G. DE HAVEN
R.O. WELTY
BY
*Hudson & Young*
ATTORNEYS

United States Patent Office 2,968,833
Patented Jan. 24, 1961

2,968,833

METHOD AND APPARATUS FOR PRILLING AMMONIUM NITRATE

Clark G. De Haven and Richard O. Welty, Bartlesville, Okla., assignors to Phillips Petroleum Company, a corporation of Delaware Filed May 17, 1957, Ser. No. 659,975

10 Claims. (Cl. 18—2.4)

This invention relates to method and apparatus for forming uniformly sized droplets from liquid melts such as inorganic salts. In accordance with one aspect, this invention relates to apparatus comprising orifice plates having sharp-edged orifices for forming uniformly sized droplets of molten liquids such as inorganic salts. In accordance with another aspect, this invention relates to an improved method for continuously producing uniformly sized droplets from molten liquid solutions by passing a molten solution through orifice plates having sharp-edged orifices, and applying a constant frequency of vibration to said solution. In accordance with another aspect, this invention relates to an improved method for continuously producing uniformly sized and substantially spherical ammonium nitrate prills from molten ammonium nitrate solutions comprising applying a constant frequency of vibration to said solution. In accordance with one specific aspect, this invention relates to an improved method for continuously producing uniformly sized and substantially spherical ammonium nitrate prills from molten ammonium nitrate solutions comprising passing said molten solution under a low pressure and at a low velocity through orifice plates having sharp-edged orifices into a quiescent zone of a liquid-solidifying medium, while mechanically applying a constant frequency of vibration to said molten solution.

A number of prior art methods for producing lead shot, for example, from molten metals have been employed in the past. The usual method for producing spherical shot involved passing the molten metal through a plate having a plurality of cylindrical perforations of relatively small size, and permitting the shot to fall through space in a shot tower for a distance sufficient to cool and solidify the shot, and finally collecting the shot in a bath of water or oil at the end of its fall in the bottom of the shot tower. One of the early modifications to this basic method for producing lead shot, for example, disclosed in U.S. Patent 194,271, Shiver, comprised the use of an orifice plate suspended on springs and the orifice plate was vibrated both vertically and horizontally by means of a fluted roller. Later, Shiver, U.S. Patent 228,481, disclosed an orifice plate made from the under side leaving projecting sides to the openings extending upward into the molten metal or liquid and means to vibrate the orifice plate. An improved method for vibrating the orifice plate was subsequently disclosed in U.S. Patent 260,976, Guild, wherein ratchet wheels were employed to vibrate the orifice plate both vertically and horizontally. More recently, Dowdell, U.S. Patent 2,287,029, disclosed an orifice plate having orifices with an upper conical section and a lower cylindrical bore section of substantial length through which molten metal was passed into a shot tower.

Numerous processes have heretofore been known for prilling ammonium nitrate melts to obtain a final prilled product for application, for example, as fertilizer. However, in most of the prior processes employed for prilling ammonium nitrate it has been very difficult to achieve any substantial uniformity as to size and shape of the prills produced. It is well known to those skilled in the art that most commercial fertilizers contain a substantial portion of fine powdery material as well as oversized particles, thereby making it very difficult, and quite annoying at times, to apply the fertilizer uniformly onto the soil.

One conventional process that has been employed in the past for the production of ammonium nitrate prills comprised the upspraying of molten ammonium nitrate into the top of a prilling tower. Breakup of each jet into individual drops was completely random in nature, forming, therefore, a wide range of shapes and sizes of prills. Further, this method of upspraying ammonium nitrate solutions into the prilling tower causes some of the molten liquid ammonium nitrate droplets to recombine into large masses. The decreasing velocity of droplets as they approach the top of their trajectory cause them to become so closely spaced that some of the droplets unite to produce oversized and dumbbell-shaped prills. The combination of these two conditions resulted in a final ammonium nitrate product which contained a high percentage of oversized prills, fines and mis-shapen particles. Further, ammonium nitrate prills of a non-uniform size do not flow freely and have a tendency to cake in storage and, in addition, are not nearly as pleasing in appearance. Thus, the prime problem encountered was to produce from the liquid jet a prill of uniform size and substantially spherical shape, and to preserve this shape during its cooling period.

It is well known that a jet of liquid discharged from an orifice is hydrodynamically stable if no disturbances are present. Even a small disturbance, however, will cause a surface wave on the jet which will trigger a necking-down process, leading to the ultimate separation of the stream into individual drops. In practice, random mechanical or fluid disturbances are always present, and these naturally tend to produce drops of random size and spacing. Moreover, because of their non-uniform size and spacing, there is a tendency for adjacent drops already formed to coalesce to form larger drops, some of which may become so large as to be shattered by the aerodynamic forces on the drop during its fall. All of these factors combine to form drops of a wide range of sizes, which is undesirable in the prilling process. Further, the orifice plates generally used in the prior art shot producing methods, as well as in the conventional upspray ammonium nitrate prilling process, contained a plurality of small diameter cylindrical holes in the plate; however, these cylindrical orifices are not entirely suitable for the production of uniform drops since they are not susceptible to controlled breakup, especially for ammonium nitrate jets. Therefore, it was necessary to construct an orifice plate meeting certain requirements, i.e., an orifice plate which would be capable of producing the size of prill desired, give a pattern of streams so that they would not interfere with one another, especially in a multi-orifice plate, and also be mechanically rugged and suitable for plant operation.

Accordingly, an object of this invention is to provide an improved orifice plate for forming uniformly sized droplets from liquid solutions such as molten inorganic salt solutions. Another object of this invention is to provide an improved method for producing ammonium nitrate prills of uniform size and substantially spherical in shape which flow freely and have less tendency to cake. Another object of this invention is to provide an improved method for producing ammonium nitrate prills of uniform size and shape that are substantially free of fines. Another object of this invention is to provide an improved process for producing substantially spherical ammonium nitrate prills wherein more than 85 percent of the finally recovered prills are of one U.S. screen size. Another object of this invention is to provide vibrating apparatus for producing uniformly sized droplets from molten solutions, such as concentrated ammonium nitrate melts. Another object of this invention is to provide novel sharp-edged orifice plates which are utilized for the production of uniformly sized droplets from molten liquid solutions, such as concentrated ammonium nitrate melts. Other aspects, objects, advantages, and features of this invention are apparent from this disclosure, the claims, and accompanying drawings.

In accordance with a broad concept of our invention, we provide an improved apparatus comprising an orifice plate having at least one orifice hole, and wherein said hole is formed by a sharp edge or knife-like edge normal to the direction of fluid flow through said plate, said plate being adapted to jet uniformly sized drops of liquid from molten liquid solutions such as molten inorganic salt solutions. More specifically, we provide an improved apparatus comprising a perforated orifice plate having a plurality of sharp-edged orifices, which are preferably symmetrically spaced, on said orifice plate for forming uniformly sized and substantially spherically shaped drops from liquid molten solutions such as molten inorganic salt solutions, particularly concentrated ammonium nitrate melts.

In accordance with another concept of our invention, we provide an improved method for producing uniformly sized and substantially spherically shaped droplets from molten solutions, such as molten inorganic salt solutions, by passing the molten solution through perforated orifice plates having at least one knife-like or sharp-edged orifice thereon while applying a controlled frequency of vibration to said solution. More specifically, we have found that uniformly sized and substantially spherically shaped prills of ammonium nitrate can be produced by spraying molten ammonium nitrate solution downwardly under a low pressure and at a low velocity through orifice plates having a plurality of symmetrically spaced sharp-edged orifices thereon to form uniform drops of solution, jetting said drops preferably into a quiescent zone of a liquid-solidifying medium, such as air, and mechanically applying vibration within a controlled frequency of vibration to the pipe header which passes molten solution to said orifices. Further, we have found that a high percentage of uniformly sized and substantially spherically shaped prills can be produced by vibrating the tube or pipe header having sharp-edged orifice plates attached thereto through which the molten solution passes, either in a horizontal or a vertical direction. In actual plant applications, we have further found that best results can be obtained if the vibrating element is mechanically connected directly to the pipe header, which has a plurality of sharp-edged orifice plates attached thereto, and the entire pipe header, which extends substantially across a prilling tower, for example, is vibrated within a predetermined controlled frequency range in a vertical direction and spraying the molten ammonium nitrate solution in a downwardly direction.

In accordance with still another concept of our invention, we have found that a substantial improvement can be obtained in the production of ammonium nitrate prills having more uniformity as to size and shape by applying a controlled vibration to ammonium nitrate solutions contained in pipe spray headers located at the top of prilling towers, for example, by mechanically vibrating said pipe spray headers within a predetermined frequency range and thereby imparting vibration to the ammonium nitrate melts within said pipes through the metal headers.

For a given system, with jet diameter and velocity constant, there is a particular frequency of disturbance to which the jet is most susceptible. If a regularly timed vibration near this frequency is applied to the stream, it will trigger the formation of uniformly sized and spaced drops at this frequency, even though other vibrations of a random nature are present.

The theory of producing orderly drop formation from a liquid jet by the use of controlled vibration was discussed in detail by Lord Rayleigh in 1877 in "Theory of Sound," second edition, volume II, chapter 20, New York, Dover Publications, 1945. The frequency of disturbance to which the jet is most sensitive is one whose wave length on the jet is about 4.5 times the diameter of the stream. The frequency to produce this critical disturbance was shown by Lord Rayleigh to be $$f = \frac{V}{L} = \frac{C_v\sqrt{2gH}}{4.5 D_s}$$

where V is the velocity of the jet, $D_s$ is the diameter of the stream or jet, and L is the distance between imposed disturbances. The diameter of the spherical prill can be calculated from the volume of the cylindrical section of the stream from which it was formed; combining this relation with the above equation, it can be seen that $$f = \frac{C_v\sqrt{2gH}}{(L/D_s)\sqrt{C_cD_o}} = \frac{C_cC_v\sqrt{2gH}D_o^2}{(2/3)D_p^3}$$

where $H$ = liquid head or pressure
$D_o$ = orifice diameter
$D_p$ = prill diameter
$C_v$ = velocity coefficient
$C_c$ = contraction coefficient From Lord Rayleigh's experiments, it was established that a fluid jet could be broken into controlled increments by imposing a frequency of vibration to the jet and that a low fluid velocity would be essential to obtain controlled jet breakup. The controlled vibration may be applied to the nitrate jet by various methods, but for best results we prefer to mechanically couple the vibrating elements to the headers so that the vibrational energy is transmitted through the piping rather than entirely through the air or fluid. Further, although a number of methods of attaching the vibrating elements to the headers may be satisfactorily employed, we have found that best results were produced by supporting the vibration exciter frame on springs at the approximate center of the pipe headers and attaching the moving armature rigidly to the manifold. In operation, the mass of the frame acts as a reaction mass in transmitting the vibratory force to the headers from the armature. The connection between the armature and pipe headers should be sufficiently rigid to properly transmit the forces involved.

We can also employ only a relatively small reciprocating force as the vibrating means for generating and applying the necessary large forces to the pipe header system to produce vigorous vibration. This can be accomplished by utilizing a mass-spring system tuned to approximately the frequency at which it is desired to operate the vibrators. Tuning can be done by so weighting the vibrator armature member and so selecting the size and shape of the rod connecting it with the pipe header that the armature plus the weight, and the rod constitute a spring-mass system whose natural frequency is approximately the frequency desired to be applied to the header. By this method and means, forces of many times the magnitude otherwise available can be produced.

In accordance with one generally preferred embodiment of our invention, uniformly sized and substantially spherically shaped ammonium nitrate prills are produced by a method comprising the steps of introducing molten ammonium nitrate solution into pipe headers located in the upper portion of a prilling tower or zone, each of said pipe headers having attached thereto a plurality of orifice plates having sharp-edged orifices thereon, maintaining said molten ammonium nitrate solution within said headers under a low pressure ranging from about 6 inches to about 6 feet fluid head, passing said solution through said sharp-edged orifices within a velocity range of from about 5 to about 20 feet per second, discharging drops of molten ammonium nitrate solution into a quiescent zone of a liquid-solidifying medium, while applying vibration within a controlled frequency of vibration ranging from about 300 to about 1400 cycles per second to said pipe headers, thereby imparting vibrations to the solution through said metal headers.

The fluid head of ammonium nitrate solution maintained within the pipe header and upstream of the sharp-edged orifices is an important variable and, for best results, is maintained within fairly close limits in order to obtain a high percentage of uniformly sized prills. If the fluid head maintained is too low, there is a tendency for the nitrate jet to cling to the orifices instead of springing free, whereas, on the other hand, if the fluid head is maintained at too high a level, initial turbulence in the jet becomes so great that it has a tendency to cause uncontrolled breakup of the stream, thus the imposed mechanical vibrations will have less effect on controlling the drop formation. As described above, the flow velocity and the fluid head maintained on the ammonium nitrate solution may vary over a considerable range; however, the flow velocities are usually maintained in a range of from about 5 to about 20 feet per second with fluid heads of from 6 inches to about 6 feet, respectively. A very satisfactory product has been obtained employing about 11 feet per second velocity with about a two foot head of liquid. Fluid heads outside these ranges may be used; however, preferred fluid heads now employed range from about 2 to about 4 feet of fluid. Vibration frequencies ranging from about 300 to about 1400 cycles per second can be effectively employed in producing regulated jet breakup of ammonium nitrate solutions; however, vibration frequencies ranging from about 550 to about 1000 cycles per second are preferred.

In accordance with specific embodiments of the orifice plates of the present invention, we provide perforated orifice plates having at least one orifice hole, preferably a plurality of symmetrically spaced holes, said hole or holes being formed by a knife-like or sharp edge which is normal to the direction of fluid flow through said plate. The number of orifices per plate will generally be governed by the desired spacing between streams in each plate. We have employed orifice plates having two, four seven, nineteen, and thirty-seven sharp-edged orifices, and each plate gave satisfactory controlled drop formation. However, we found that a nineteen hole plate provided the most satisfactory compromise between practical stream separation and reasonable throughput per plate. An important feature of the perforated plates of the present invention is the provision of a hole or holes in the plates having a sharp or knife-like edge. The mechanical construction of the sharp-edged orifices in the perforated plates may vary considerably in that the cross-section of the countersunk hole may be conical in shape, elliptical, or circular, or the orifice may even have a thin flat edged section in combination with an outwardly flared portion, but the thickness of the cylindrical portion of the orifice must not be more than one-sixth of the orifice diameter. Orifice plates comprising very thin sheet metal, for example, ranging in thickness from 0.001 to 0.007 inch with holes may be employed as sharp-edged orifices. Orifice diameters that can be employed in the practice of the present invention may range from 0.01 inch to about 0.10, or more, inches; however, we prefer to employ orifice diameters ranging from about 0.03 inch to about 0.075 inch, more preferably ranging from about 0.04 to about 0.055 inch. Orifice plates having outwardly flared orifices may be employed with their vertices either facing downwardly or upwardly in actual use. However, in actual plant practice, we prefer to place the vertices of the orifices in an upwardly direction so as to protect the delicate sharp edges from accidental mechanical damages which can so readily occur in plant operations.

Referring now to the drawings, our invention will be more fully explained. It will be understood that the drawings are diagrammatic in nature and are included for illustrative purposes only. Conventional apparatus such as pumps, heat exchangers, control instruments, etc., have, for the most part, been omitted for the sake of simplicity. The use of such equipment, however, is within the scope of the invention.

Figure 1:
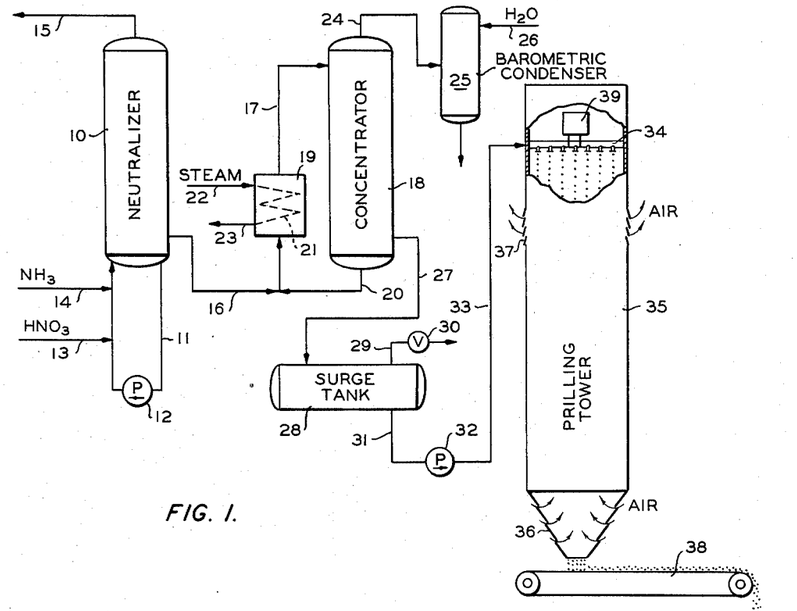
Figure 1 is a schematic representation of an ammonium nitrate prilling process employing vibrating elements attached to the top of the headers in a prilling tower and orifice plates having sharp-edged orifices are attached to the end of the nozzles on the bottom of the headers.

Referring now to the drawings in detail and to Figure 1 in particular, there is shown a schematic representation of generally preferred apparatus which can be employed to produce aqueous ammonium nitrate solutions and to form uniformly sized prills of ammonium nitrate. The ammonium nitrate is produced by the reaction of gaseous ammonia with nitric acid. The reaction is carried out in a neutralizer vessel 10 which is designed to receive a proper ratio of ammonia gas and nitric acid in a circulating stream. A substantial amount of the resulting ammonium nitrate solution is withdrawn from the bottom of neutralizer 10 through a conduit 11 which has a pump 12 therein. A conduit 13 introduces aqueous nitric acid into conduit 11 on the discharge side of pump 12. The gaseous ammonia is then introduced into conduit 11 through a conduit 14 to neutralize the circulating stream. The resulting solution is returned to neutralizer 10 through conduit 11. The temperature rise due to the heat of reaction causes evaporation of the water and concentration of ammonium nitrate solution in neutralizer 10. The steam which is formed by the heat of reaction is removed from neutralizer 10 through a conduit 15. The reaction generally is controlled so that the pH of the condensed steam removed through conduit 15 is within the range of approximately 9 to 11, which indicates an excess of ammonia. This excess is desired so that no excess nitric acid is contained in the finished product.

Ammonium nitrate solution is removed from neutralizer 10 through a conduit 16 which communicates with a concentrator 18 through a heat exhanger 19 and conduit 17. A portion of the liquid in concentrator 18 is also delivered to the inlet of heat exchanger 19 by means of a conduit 20. Steam or other heating medium is introduced into a coil 21 and heat exchanger 19 by means of an inlet conduit 22 and removed through an outlet conduit 23. The ammonium nitrate solution concentrator 18 is heated sufficiently to increase the concentration of the solution to the desired value, preferably approximately 95 percent. The resulting steam is removed from concentrator 18 through a conduit 24 which communicates with a barometric condenser 25. Cooling water is introduced into condenser 25 through a conduit 26. Condenser 25 maintains a pressure in concentrator 18 less than atmospheric to facilitate the concentration process.

The concentrated ammonium nitrate solution is withdrawn from concentrator 18 through a conduit 27 which communicates with a surge tank 28. Because of the reduced pressure in concentrator 18, a liquid level normally exists in conduit 27 above the top of surge tank 28. Tank 28 can be vented through a conduit 29 which has a valve 30 therein. The ammonium nitrate solution in tank 28 is removed through a conduit 31 which has a pump 32 therein. Pump 32 is preferably a centrifugal pump; however, a reciprocating pump can be used, if desired, but a constant head tank would be required in this case to maintain a constant pressure to the spray headers. The ammonium nitrate solution is passed by way of pipe 33 preferably to a constant head tank or surge tank (not shown) and thence to header 34 in the top of prilling tower 35. As previously pointed out, accurate fluid head control to the headers is important in the operation of our invention for best results. This is accomplished preferably by employing a constant head tank, or surge tank, in the top of the prilling tower for supplying the headers with solution, which can be controlled by either a liquid level controller or an overflow weir. In the absence of a constant head tank, or a surge tank, the fluid head in the headers can be controlled by utilizing throttling valves (not shown) on the discharge from pump 32 to regulate the flow, and measuring the head by observing the height to which a small vertical jet of nitrate will rise from the headers. Air enters the lower region of tower 35 through louvers 36 by way of a conduit and blower (not shown). The cooling air leaves the upper portion of the tower through louvers 37 which are located preferably somewhat below the spray headers, thereby providing a quiescent zone of cooling air immediately below the spray headers. If desired, windshields or deflectors can be placed external to the prilling tower around openings 37 so as to protect the quiescent zone of air within the tower from high velocity winds such as occur in the Texas Panhandle, for example. The ammonium nitrate droplets solidify in descending through the rising column of air in tower 35 so that solid prills are removed from the bottom of tower 35 by conveyor belt 38.

Figure 2:
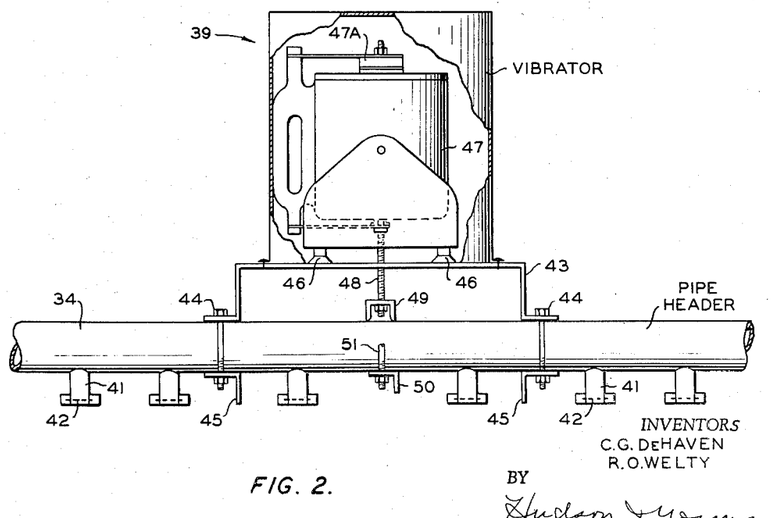
Figure 2 is a side view of a schematic representation of a vibrator element mechanically attached to the header in the top of the prilling tower.
Figure 3:
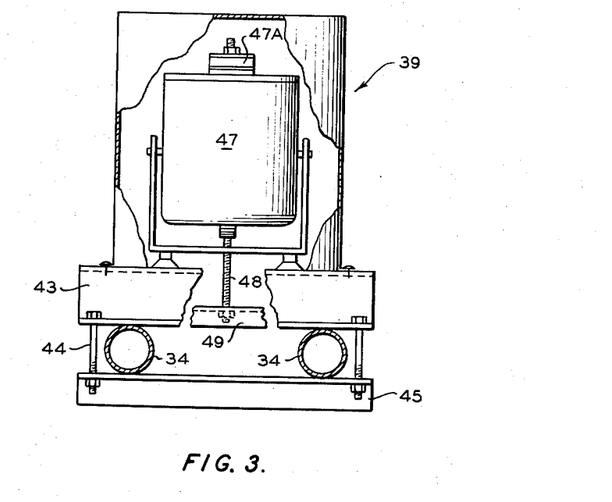
Figure 3 is an end view, partially cut away, of the vibrator shown in Figure 2.
Figure 4:
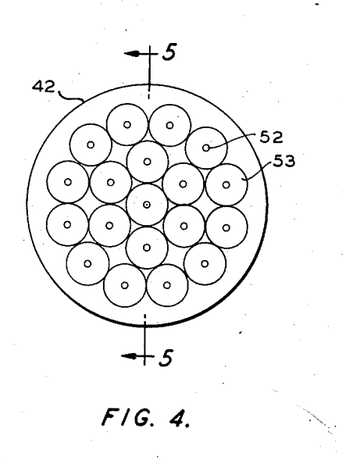
Figure 4 is a schematic representation of a plan view of an orifice plate having a plurality of sharp-edged orifices with conically shaped outwardly flared sections symmetrically spaced thereon.

In accordance with the present invention, a vibrator 39, which is connected to a suitable source of power supply, is mechanically connected directly to the top of pipe header 34 in the top of prilling tower 35. In Figure 2, there is shown pipe header 34 having a plurality of nozzles 41 on the bottom of the header and secured to each nozzle 41 is an orifice plate 42. The orifice plates 42 are held onto the end of nozzles 41 by an orifice plate holder and fist-nut, for example. The orifice plates 42 are preferably removable so that they can be readily replaced, if desired. At some intermediate point along the header 34, preferably near the midpoint, a metal base 43 for vibrator 39 is attached securely to pipe header 34 by angle irons 45 and bolts 44. On top of base 43 are mounted four spring mounts 46 which are attached to the framework of the vibrator. The framework of the vibrator mounts the field coil 47. The armature 47A of the vibrator 39 is attached to a rod 48 which is coupled by means of channel 49 and angle iron 50 and bolts 51 directly to pipe header 34 substantially mid-way between the connections of frame 43 to pipe header 34. An end view of the vibrator 39 connected to the pipe header is illustrated in Figure 3. In actual operation, the force is applied between the vibrator frame 39 and header 34, alternately tending to separate and to draw together the two masses. The spring mounts 46 supporting the vibrator frame allow this relative motion to occur without undue resistance.

Isolation of the orifice plates from extraneous vibrations in the frequency range of 100 cps. to 1500 cps. is highly desirable for best results. This can be readily accomplished by supporting the pipe header system on neoprene shock mounts, for example, to prevent extraneous tower vibrations from having any effect on the pulsed prilling. The pipe header system can also be isolated from connecting piping by the use of flexible expansion joints, for example.

As shown in Figures 2 and 3, a single vibrator is mechanically attached to two headers, however, a single vibrator may be utilized for each header or a single vibrator may be used on a number of headers, if desired. Further, as shown in Figures 2 and 3, the vibrator is preferably located at some intermediate point between the extremities of the headers, however, the vibrator could be connected to a point in the conduits leading to the headers, if desired. It should be pointed out that the structure connecting the vibration exciter to the pipe header may be heavier and more rigid than shown in the drawings. Also, a mass may be attached to the top of the armature in such a manner that the mass on the connecting members to the structure has a natural frequency equal to the applied frequency so that the resonant force built-up amplifies the vibratory force on the pipe header.

We have found from actual experience that the utilization of vibrating elements attached to the pipe spray headers and spraying ammonium nitrate melt through sharp-edged orifices into a prilling tower that this method of operation produces a high percentage of uniformly sized prills of ammonium nitrate which are almost completely free of fines. For a given orifice size employed in the header, the frequency of the vibration utilized depends primarily upon the pressure or fluid head at the orifices. The pressure or head of liquid determines the velocity and, thus, directly the frequency in accordance with Lord Rayleigh's equation $$f = \frac{0.85\sqrt{2\eta H}}{4.5d}$$

The constant in the denominator of the above equation may vary from 4 to 10; however, values outside these limits may be utilized, but it becomes increasingly difficult. We have also determined that the volume of the prills varies inversely with the frequency employed. The lower the frequency, the larger is the diameter of the prills. The preferred frequency utilized for the production of uniformly sized ammonium nitrate prills ranges from about 550 to 1,000 cycles per second; however, successful pulsing has been effected down to 300 and up to 1,400 cycles per second. It is also preferred that a low pressure or fluid head be used in the pipe header. Fluid heads in the pipe headers ranging from about 6 inches to about 6 feet may be used, preferably from 2 to about 4 feet. The velocity of the liquid jet leaving the orifices should be less than the terminal velocity of the prills formed to insure that the prills do not recombine as they pass down the tower. Flow velocities through the orifices with vibration applied may range from about 5 to about 20 feet per second, preferably from about 8 to about 15 feet per second.

One of the principal advantages of the present invention is that by applying a regular disturbance to assist regular break-up of a jet into drops, the uniform drops so formed have very little velocity relative to one another, and hence exhibit a much reduced tendency to approach one another and recombine into larger drops. Recombination of drops into large, non-uniform drops is a problem in conventional prilling operations, but is not a problem in the practice of our invention.

When drops are formed from a jet, they undergo repeated inversion in shape from an oblate to a prolate spheroid and back again until viscous damping quiets the drop into a spherical shape. In order to prevent premature freezing of the drop before it has a chance to become spherical, a quiet zone of non-circulating fluid, preferably air, of from approximately 10 to 25 feet deep is preferably provided immediately below the spray orifices in the practice of the present invention, as is shown in tower 35 accompanied with the description of Figure 1. The utilization of this quiet zone of air also helps to prevent recombination of drops which might be caused by the drops being whipped around by high velocity air blasts. Since the still air zone aids materially in the orderly formation of the nitrate prills other methods of providing a quiescent air zone than illustrated in Figure 1 may be employed. For example, metal hoods or awnings may be installed over the pipe headers to provide a "quiet zone" effect.

A plan view of an orifice plate having a number of tapered sharp-edged orifices, according to the present invention, is shown in Figure 4 and a sectional view of the orifice plate is shown in Figure 5. As illustrated in Figure 4, the sharp-edged orifices of the present invention are symmetrically spaced on the orifice plate 42. In Figure 5, plate 42 is illustrated as being provided with apertures 52 having a lower outwardly flared wall or conical portion 53 which is drilled to provide an angle of approximately 120°. It will be noted in Figure 5 that the flow enters from the right and passes through the sharp-edged orifice holes or apertures 52 and then drops down through the conical portion 53 of the orifice plate before going on down through the tower. It will be noted upon observing Figures 5 and 6, for example, that the ammonium nitrate melt as it passes through the orifice plate contacts the orifice plate only at the sharp or knife-edged portion of the orifice and flows through the flared out portion of the orifice, which can be substantially conical, elliptical or spherical in shape, or any combination of these shapes, as a thin continuous stream without contacting the remaining portion of the orifice, and then is ultimately formed into the desired substantially spherical prills a short distance from the orifice plate. However, when vibrations are imparted to the ammonium nitrate, the magnitude of vibration may be increased so that the droplets or prills form very near or at the knife edge. An important feature of the invention is that the point at which the ammonium nitrate melt passes through the orifice plate must be a knife-like or sharp-edge orifice. As previously pointed out, the vertices of the sharp-edged orifices may be pointed either upwardly or downwardly, but we prefer to have the vertices pointed upwardly for a practical reason in that the delicate sharp edges are protected from accidental mechanical damage which so readily occurs in plant operations. Our orifice plate can also be comprised of a very thin sheet of metal ranging in thickness between about 0.001 and 0.007 inch and having at least one hole ranging in diameter from 0.01 to 0.10 inch, preferably 0.03 to 0.055 inch. Thus, since the metal is so thin the entire metal thickness is virtually a sharp edge.

The diameter of plate 42 may be made any dimension desired, depending upon the prilling capacity desired in the prilling tower. The sharp-edged orifices 52 of Figure 5, for example, are preferably made by drilling a tapered hole into plate 42 and then finish drilling the very short distance through the plate with a small drill the size of the orifice diameter desired in the nozzle plate or making the relief around the orifice hole with a ball end mill. Orifice diameters that may be employed in the practice of the present invention preferably range from 0.04 inch to 0.055 inch in diameter; however, orifice diameter sizes outside of this range, for example, as low as 0.01 and as high as 0.10 inch may be successfully employed. When using a tower of considerable height, for example, as described in Figure 1, orifice diameters of approximately 0.049 inch, or larger, can be used to produce prills of optimum size.

Figure 6 shows a second embodiment of an orifice plate having sharp-edged orifices of the present invention wherein the tapered surface 54 is substantially spherical or elliptical in shape. In this embodiment, it will be noted that the surface of the sphere nearly coincides with a surface of the plate, thereby providing substantially a sharp-edge for the orifice holes.

It should be emphasized once again that, for proper control of jet breakup, it is highly desirous that all orifices be smooth and free from burrs and dirt. Particles of dirt or surface irregularities in or near the orifice will produce disturbances in the jet that will cause it to break up in a random fashion rather than being regularly divided into drops by the impressed vibrations. It is very difficult, from the construction standpoint, to drill orifice holes having knife-like or sharp edges that are free from burrs. If a tapered drill bit alone is employed to form the sharp-edged orifice holes irregularities and burrs are formed. As discussed above, we prefer to drill the tapered portion of the orifice hole to at least within 0.007 inch of the plate thickness, and then drill through the remaining thickness of the plate with the desired diameter bit, for example, to form the sharp-edged orifice, or the recess may be cut by making the relief around the orifice hole with a ball end mill. This does not always result in an orifice hole that is dead sharp, but as long as the thickness of the sharp edge of the orifice is not more than ⅙ the orifice diameter, satisfactory results still can be obtained. However, we prefer to obtain as nearly as possible, within construction limitations, an orifice having knife-like or sharp edges.

The relationship between fluid head, vibration frequency, orifice diameter, and prill size is shown in Figures 7 and 8. The equation used was $$f=\frac{C_c C_v \sqrt{2gH} D_o^2}{(\frac{2}{3}) D_p^3}$$

and to adequately determine the prill size it was necessary to obtain values for $C_c$ and $C_v$. These were determined by experimental means. The velocity coefficient $C_v$ was obtained by taking still photographs of the jet breakup at known frequency, using the single flash of the stroboscopic light in conjunction with a Polaroid camera, and then measuring the distance between droplets.. This gave a $C_v$ of approximately 0.95. The contraction coefficient $C_c$ was found to be 0.75 by measuring the flow rate through the orifice.

Figure 7 shows the relationship between head, frequency, and prill size for a fixed orifice diameter. For example, it can be seen that a 0.040 inch diameter orifice can, while maintaining a L/D=4.5, produce a prill of 0.066 inch diameter with either a frequency of vibration of 815 cycles per second and a 2 foot head, or a frequency of 1,000 cycles per second and a 3 foot fluid head. It is evident from this that by increasing the fluid head the velocity of the fluid increases, and in order to produce prills of the same diameter the frequency of vibration must be increased.

Figure 8 shows the relationship between orifice diameter, frequency of vibration, and prill size at a constant 3 foot head. A given orifice may be used to produce a range of prill sizes by varying the vibration frequency at a constant head. For example, a 0.040 inch diameter orifice will produce a prill size of 0.066 inch diameter with a frequency of 1,000 cycles per second and L/D=4.5. With a frequency of 700 cycles per second a prill size of 0.074 inch diameter is produced with a L/D=7. The limit of variation may be defined in terms of the L/D ratio which should be held between approximately 3.5 and 8.0 for good operation. It should be remembered however, that the best theoretical operation will be at a L/D of 4.5.

The usefulness of the method and apparatus of the present invention and of the general method of application will be illustrated in the following examples.

Example I

An ammonium nitrate solution prepared substantially as set forth in the description of Figure 1 was concentrated to approximately 95 percent in a concentrator, which was maintained at a temperature of approximately 140° C. and a pressure of approximately 288 mm. of mercury. The resulting concentrate was pumped to the top of a prilling tower into spray headers adjacent the side walls of the tower and sprayed into the top of the tower at a rate of approximately 108 g.p.m. Cooling air was introduced into the bottom of the prilling tower at a rate of approximately 180,000 c.f.m. and at a temperature of approximately 24° C., and removed in the upper portion of the tower at a temperature of approximately 37° C. The height of the prilling tower was approximately 97 feet, and the prills were removed from the column bottom at a temperature of approximately 75° C. A "quiet zone" effect was obtained by extending awnings of corrugated aluminum out over the headers, thereby creating a relatively still air space surrounding the orifice plates.

Figure 5:
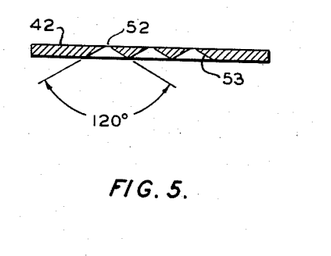
Figure 5 is a sectional view of the orifice plate shown in Figure 4.
Figure 6:
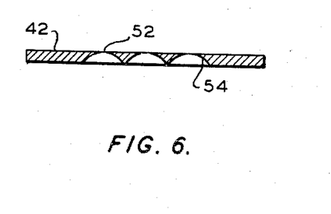
Figure 6 is a schematic representation of a sectional view of a second embodiment of an orifice plate having a plurality of sharp-edged orifices with a spherically shaped outwardly flared section of the present invention.
Figure 7:
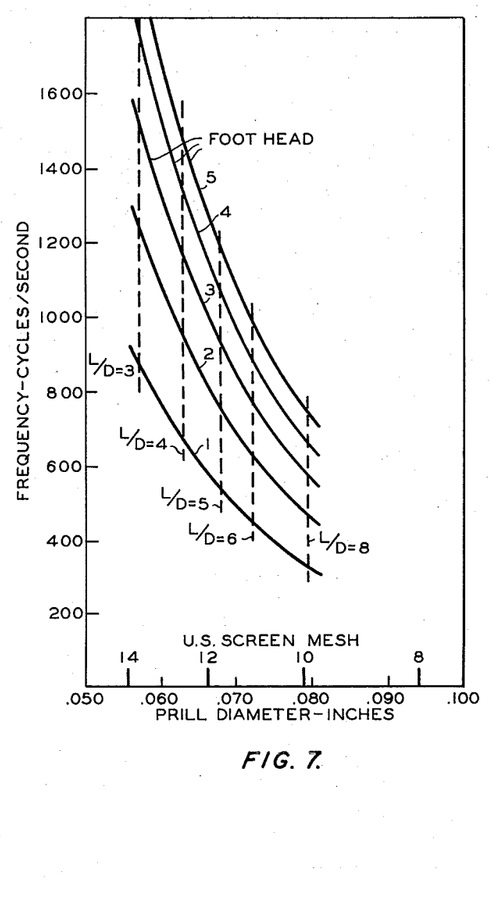
Figure 7 shows the relationship between fluid head, vibration frequency, and prill size for a fixed orifice diameter.
Figure 8:
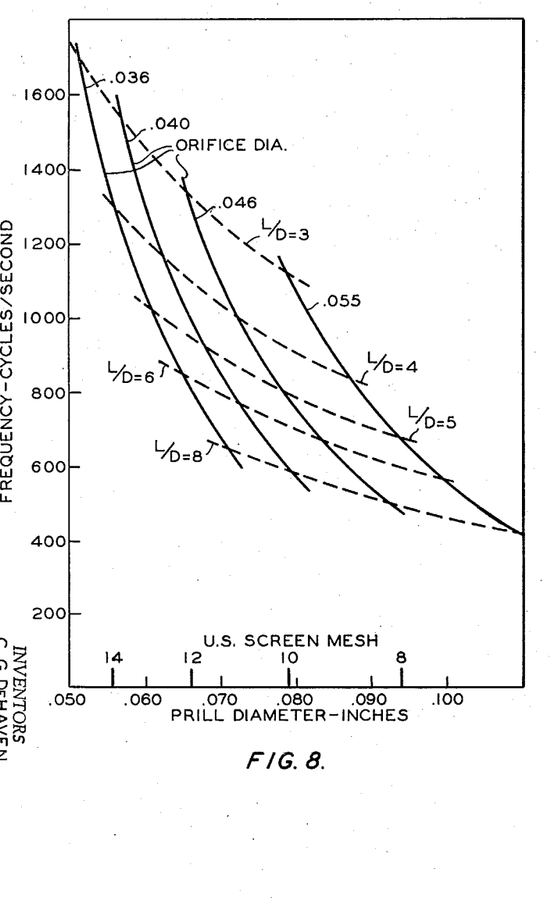
Figure 8 shows the relationship between orifice diameter, frequency vibration, and prill size at a constant fluid head.
Figure 9:
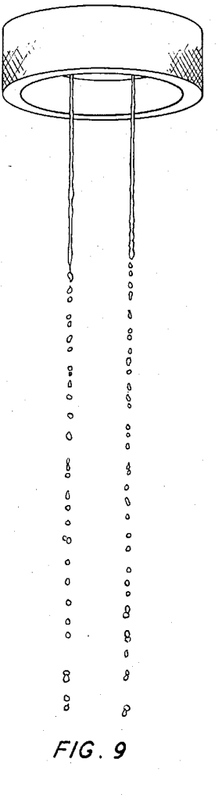
Figures 9–12 are photographs of tests conducted employing orifice plates having cylindrical orifice holes of conventional construction compared with plates having sharp-edged orifices of the present invention, both types of plates being tested with and without vibration.
Figure 10:
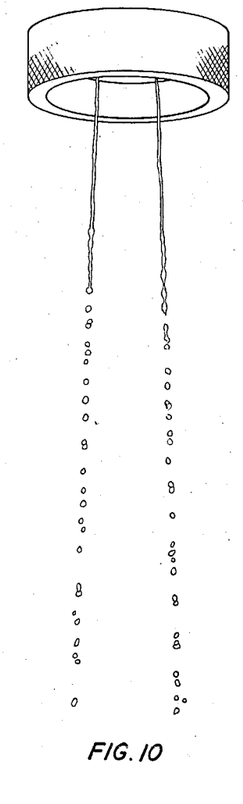
Figure 11:
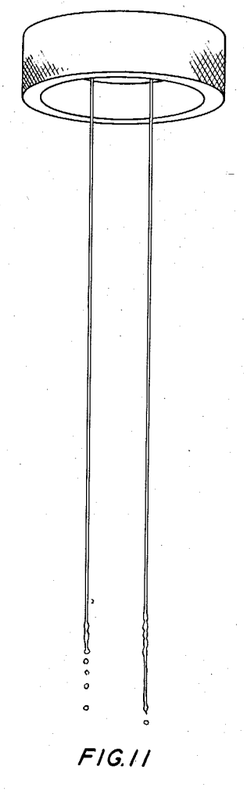
Figure 12:
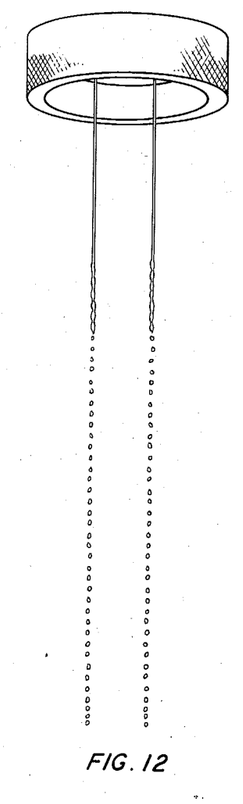

Ammonium nitrate concentrate was sprayed into the quiescent air zone through 80 orifice plates having nineteen 0.04 inch diameter sharp-edged holes in each plate similar in construction to Figure 5, and these orifice plates were equally spaced along the length and bottom of four spray headers which extended substantially across the prilling tower, two of the headers being on each side of the tower and adjacent the walls. The headers were aligned so that the orifice plates were directed downward and toward the center of the tower at an angle of approximately 45 degrees. Also, the vertices of the sharp-edged orifices faced the liquid supply. A vibrating element was directly attached to the top of each pair of headers approximately mid-way between the extremities of the headers. The vibration exciters were driven by a suitable source of electronic power supply. The headers were vibrated at a rate of approximately 840 c.p.s.

The ammonium nitrate prills obtained as product from the above-described operation were analyzed for size, and it was found that 96 percent of the prills passed through 10 on to a 14 mesh screen and only 4 percent passed through 14 on to a 20 mesh screen. Thus, it can be seen from this example that, by the practice of the present invention, a high degree of uniformity as to the size of ammonium nitrate prills produced is made possible without the production of an appreciable amount of fines.

*Example II*

A 95 percent ammonium nitrate concentrate was passed under substantially the same conditions as set forth in Example I to a prilling column utilizing upspray headers having conventional ⅛ inch thick orifice plates with 0.025 inch diameter cylindrical holes, but the headers were not vibrated as in Example I.

An average sieve analysis of eight runs showed that 2 percent passed through an 8 mesh sieve on to a 10, 62.8 percent passed through 10 on to 14 mesh sieves, and 35.2 percent through a 14 on to a 20 mesh, or smaller, mesh sieve. Thus, it can be seen from these data the wide range and non-uniformity of sizes, as well as a large percentage of fines, obtained by a conventional upspray prilling operation employing cylindrically shaped orifices.

*Example III*

A series of tests were made to determine the effect of vibration as well as structure of the orifices utilized. A pipe header containing liquid under 3 feet of head was fitted with orifice plates having cylindrical holes for two tests and fitted with tapered sharp-edged orifices, according to the present invention, for two other tests, one test for each of the orifice plates being conducted without vibration of the orifice plate. Results of these tests are shown in the photographs illustrated in Figures 9 to 12.

The 1/16 inch thick orifice plate employed illustrated by the results in Figures 7 and 8 had 0.052 inch diameter cylindrical holes. The first test was carried out without vibration, and, in the second test, the header was vibrated at a rate of 960 c.p.s. It will be noted that there is very little difference in the shape of the droplets formed during these two tests, as illustrated in Figures 9 and 10. Further, the droplets were not of uniform shape.

In the second set of tests, tapered sharp-edged orifices similar in shape as described for Figure 5, according to the present invention, having 0.052 inch diameter holes and having their vertices pointing upwardly, were employed. Figure 11 illustrates the droplets being produced from the sharp-edged orifices with no vibrations applied. Figure 12 illustrates the results obtained when using the sharp-edge orifices with the stream being vibrated at a rate of 960 c.p.s.

It will be noted upon observing the photographs that the droplets formed with the sharp-edged orifices were substantially all spherical and of uniform size. It should be pointed out, however, that without vibration being applied to the sharp-edge orifices there may be recombination of drops, thus possibly producing both oversize prills as well as a small amount of fines. The sharp-edged orifices of the present invention produce a jet with velocity nearly uniform across the jet cross-section, whereas conventional cylindrical orifices do not. Further, the jet with a uniform velocity will behave more predictably and produce better prills under either natural or force breakup. In addition, the sharp-edged orifice is an efficient tool for imposing a clean, perfectly formed perturbation on the otherwise smooth surface of the jet when an external controlled vibration is applied. By combining vibration with the sharp-edged orifices it is possible to positively regulate the size and frequency of drop formation. The drops, being substantially perfectly uniform in size, spacing, and frequency, possess virtually identical velocities, and there is a marked decrease in the tendency for the drops to recombine during their fall.

These data clearly show the improved results possible for the formation of uniformly sized prills, by the practice of the present invention, when the sharp-edged orifices are employed with or without vibration being applied to pipe header, for example.

Where the term "concentrated ammonium nitrate" is used in the specification and the appended claims, we mean to include any solution of ammonium nitrate that is not so highly concentrated that it will not flow and that it is sufficiently concentrated to enable the droplets thereof that are sprayed into the cool, gaseous medium to solidify in the manner well known in the art. The terms "ammonium nitrate," "pebbed ammonium nitrate," "ammonium nitrate solution," "ammonium nitrate prills," and "ammonium nitrate melts," as used in the art and herein, are not limited to materials containing only ammonium nitrate, but include other materials which may be present such as calcium carbonate, limestone, dolomite, etc.; however, the ammonium nitrate constitutes the continuous phase in which these other materials are or may be dispersed. Also, the term "liquid solidifying medium" includes air or other medium suited to the cooling and therefore solidifying of the droplets of nitrate or other material to be solidified.

While we have described our invention as applied to the production of ammonium nitrate prills from concentrated ammonium nitrate solution or melts, obviously our invention is not necessarily limited thereto, and the method and apparatus described and illustrated herein can be employed in the production of other granulated materials, such as salts having chemical and physical characteristics similar to that of ammonium nitrate, such as urea, mixtures of ammonium nitrate and ammonium phosphate, and the like, from melts similar to ammonium nitrate melts. Furthermore, various modifications of the embodiments illustratively set forth herein will become apparent to those skilled in the art and can be made without departing from the scope and spirit of the invention.

We claim:

1. A method for the production of spherically shaped ammonium nitrate prills of substantially uniform size which comprises introducing a concentrated aqueous solution of ammonium nitrate into a pipe header, maintaining a low fluid head of solution within said header, applying to said solution within said header vibrations of a predetermined frequency within the range of about 300 to about 1,400 c.p.s. by vibrating said pipe header, passing said solution downwardly from said pipe header at a low velocity through knife-edged orifices to form uniformly sized drops of solution, allowing said drops to fall freely first through a quiescent zone of a liquid-solidifying medium and then through a countercurrent zone of said liquid-solidifying medium, and collecting the resulting uniformly sized ammonium nitrate prills as a product of the method.

2. In an improved method for the production of ammonium nitrate prills that are uniform in size and shape and substantially free of fines which comprises mixing nitric acid in ammonia to produce ammonia nitrate, heating the ammonium nitrate formed to evaporate water therefrom to form a concentrate of approximately 95 percent, introducing said concentrate into a restricting zone comprising pipe headers positioned in the upper portion of a prilling zone, maintaining a fluid head of solution ranging from about 6 inches to about 6 feet within said pipe header, the improvement comprising applying to said solution within said header vibrations of a frequency within the range of about 300 to about 1,400 c.p.s. by vibrating said pipe header, passing said solution from said pipe header through knife-edged orifices at a flow velocity ranging from about 5 to about 20 feet per second to form uniformly sized drops of solution, passing said drops downwardly through a quiescent zone of a liquid-solidifying medium to cool and solidify said drops, passing said drops through a countercurrent zone of said liquid-solidifying medium, and collecting the uniformly sized ammonium nitrate prills as a product of the method.

3. Apparatus for producing uniform drops of liquid melts comprising, in combination, a prilling tower, a liquid supply conduit in an upper portion of said tower, a downwardly extending spray nozzle in open communication with the bottom of said conduit and attached to said conduit, a spray plate having a plurality of knife-edged orifices for spraying liquid at the discharge end of said spray nozzle, and pulsating means for vibrating said conduit.

4. An apparatus for producing uniform droplets from liquid melts, such as concentrated solutions of ammonium nitrate, comprising, in combination, a prilling tower, a pipe header closed at one end in an upper portion of said tower, a connection at the other end of said pipe header for supplying liquid melt to said header, a plurality of downwardly extending spray nozzles attached to the bottom of said header, a spray plate held in place at the end of each of said nozzles containing a plurality of small knife-edged orifices, and pulsating means mechanically attached to the top of said header at an intermediate point between the extremities of said header for imparting vibration to said melt within said header.

5. An apparatus for producing substantially spherical droplets of liquid melts, such as ammonium nitrate melts, comprising in combination, a prilling tower, a pipe header closed at one end in an upper portion of said tower, a connection at the open end of said header for supplying liquid to said header, a plurality of downwardly extending spray nozzles attached to the bottom of said header, an orifice plate attached to the end of each of said nozzles containing a plurality of knife-edged orifices having outwardly flared walls, said orifices ranging in diameter from 0.01 inch to 0.10 inch, and pulsating means mechanically attached to the top of said header at an intermediate point between the extremities of said header for imparting vibration to the solution within said pipe through the metal header.

6. In a prilling tower having side walls of substantial height, a collecting device near the bottom of said tower, cooling means adapted to provide a cooling zone in said tower, and a feed line supplying liquid melt to the top of said tower, spraying units comprising a plurality of pipe headers having droplet formers attached thereto, said headers being located in the upper portion of said tower and above said cooling zone, each of said spraying units comprising a pipe header, a connection to said header for supplying liquid melt to said pipe header from said feed line, a plurality of downwardly extending nozzles attached to the bottom of said header and communicating with the inside of said header, a spray orifice plate securely held on the end of each nozzle, each of said orifice plates having a plurality of knife-edged orifice holes with outwardly flared walls, and pulsating means operatively connected directly to said pipe headers for imparting vibration to the liquid melt within said pipe through the metal header.

7. In a prilling tower having side walls of substantial height, a collecting device near the bottom of said tower, cooling means adapted to provide a cooling zone in said tower, and a feed line supplying liquid to the top of said tower, spraying units comprising a plurality of pipe headers having droplet formers attached thereto, said headers spaced across the top of said tower, each of said spraying units comprising a pipe header closed at one end, a connection to said header for supplying liquid melt to said header from said liquid feed line, a plurality of downwardly extending nozzles attached to the bottom of said header and communicating with the inside of said pipe header, a removable spray orifice plate securely held on the end of each nozzle, each of said orifice plates having a plurality of knife-edged orifices with outwardly flared walls spaced symmetrically on said orifice plate, the diameter of said orifices ranging from about 0.01 to about 0.10 inch, the vertices of said orifices facing the supply of liquid in said pipe headers, and pulsating means vibrating within a frequency range of about 500 to about 1,000 c.p.s., mechanically attached to the top of said pipe headers for imparting vibration to the liquid within said pipe through the metal header.

8. In the production of uniformly sized prills from a molten inorganic salt solution, particularly concentrated ammonium nitrate melts, employing a method where said solution is sprayed from a restricting zone through a plurality of knife-edged orifices into direct contact with a liquid-solidifying medium, such as air, the improvement comprising applying to said liquid in said zone vibrations of a predetermined frequency within the range of about 300 to about 1,400 c.p.s., thereby injecting substantially spherical droplets of said liquid from said restricting zone into said solidifying medium.

9. A method for the production of ammonium nitrate prills in the shape of substantially uniformly sized spheres which comprises flowing a concentrated aqueous solution of ammonium nitrate to a restricted zone, maintaining said solution under a low fluid head within said zone, applying to said zone vibrations of a predetermined frequency within the range of about 300 to about 1,400 c.p.s. spraying said solution as uniform drops from said restricted zone through a plurality of knife-edged orifices into direct contact with a liquid-solidifying medium, and collecting the resulting ammonium nitrate prills as a product of the method.

10. A method for the production of uniformly sized spherically shaped ammonium nitrate prills which comprises flowing a concentrated aqueous solution of ammonium nitrate to a pipe injection header, maintaining said solution under a low fluid head, applying to said solution within said header vibrations of a predetermined frequency within the range of about 300 to about 1,400 c.p.s. by vibrating said pipe injection header, passing said solution as uniform drops from said pipe injection header at a low velocity through a plurality of small knife-edged injection apertures, injecting said drops into a quiescent zone of a liquid-solidifying medium to cool and solidify said drops, contacting said drops with a countercurrent stream of said medium, and collecting the resulting uniformly sized ammonium nitrate prills as a product of the method.

References Cited in the file of this patent

UNITED STATES PATENTS

| | | |
|---|---|---|
| 1,088,635 | Stevens | Feb. 24, 1914 |
| 1,276,245 | Millard et al. | Aug. 20, 1918 |
| 1,503,371 | Meyer | July 29, 1924 |
| 1,937,757 | Gleason | Dec. 5, 1933 |
| 1,951,790 | Curran | Mar. 20, 1934 |
| 1,980,672 | Engel | Nov. 13, 1934 |
| 2,044,806 | Naiman | June 23, 1936 |
| 2,077,373 | Formhals | Apr. 13, 1937 |
| 2,298,934 | Foster | Oct. 13, 1942 |
| 2,510,574 | Greenhalgh | June 6, 1950 |
| 2,528,407 | Yeandle | Oct. 31, 1950 |
| 2,714,224 | Schaub | Aug. 2, 1955 |